US008539802B2

(12) United States Patent
Meyerle

(10) Patent No.: US 8,539,802 B2
(45) Date of Patent: Sep. 24, 2013

(54) MOVEMENT TRANSMISSION DEVICE AND METHOD

(75) Inventor: Herbert Meyerle, Unterfohring (DE)

(73) Assignee: Simonvoss Technologies AG, Unterfohring (DE)

( * ) Notice: Subject to any disclaimer, the term of this patent is extended or adjusted under 35 U.S.C. 154(b) by 623 days.

(21) Appl. No.: 10/556,012

(22) PCT Filed: May 7, 2004

(86) PCT No.: PCT/EP2004/004903
§ 371 (c)(1),
(2), (4) Date: Feb. 1, 2007

(87) PCT Pub. No.: WO2004/099640
PCT Pub. Date: Nov. 18, 2004

(65) Prior Publication Data

US 2007/0137326 A1 Jun. 21, 2007

(30) Foreign Application Priority Data

May 9, 2003 (DE) ................................ 103 20 873

(51) Int. Cl.
*B60R 25/04* (2013.01)

(52) U.S. Cl.
USPC ........ 70/257; 70/34; 70/386; 70/222; 70/277; 70/472

(58) Field of Classification Search
USPC .. 70/222, 223, 257, 277, 279.1, 278.1–278.3, 70/472, 33, 34, 386
See application file for complete search history.

(56) References Cited

U.S. PATENT DOCUMENTS

| | | | | |
|---|---|---|---|---|
| 886,778 | A | 5/1908 | Dunlap | 192/59 |
| 998,615 | A | 7/1911 | Hueke | 464/38 |
| 1,437,160 | A | 11/1922 | Sokolov et al. | 70/189 |

(Continued)

FOREIGN PATENT DOCUMENTS

| | | |
|---|---|---|
| DE | 1 553 518 | 12/1970 |
| DE | 37 42 189 | 6/1989 |

(Continued)

OTHER PUBLICATIONS

"Notification of Transmittal of Translation of the International Preliminary Report on Patentability" for International application No. PCT/EP2004/004903, filed May 7, 2004.

(Continued)

*Primary Examiner* — Suzanne Barrett
(74) *Attorney, Agent, or Firm* — Westman, Champlin & Kelly, P.A.

(57) ABSTRACT

A device and a method are provided for transmitting a movement as well as corresponding forces or moments and in particular a rotational movement, wherein the transmission only takes place in a coupled state but not in a decoupled state. Devices and methods of this kind are in particular used in the field of lock devices, such as door or safe locks and the like. The device, in particular for a movement as well as corresponding forces and/or moments comprises a drive and a take-off, wherein the drive and take-off are coupled via a coupling element in such a manner that in the decoupled state a movement of the drive causes a movement of the coupling element which is not suitable for transmitting a movement of the drive to the take-off.

42 Claims, 7 Drawing Sheets

(56) References Cited

U.S. PATENT DOCUMENTS 1,725,833 A 8/1929 Simpson ........ 192/59
2,339,980 A 1/1944 George ........ 70/422
2,797,564 A 7/1957 Bonneau et al. ........ 464/38
2,911,816 A * 11/1959 Jones et al. ........ 70/386
3,659,444 A * 5/1972 Wellekens ........ 70/360
4,108,482 A 8/1978 Dietrich et al. ........ 70/472
4,712,398 A 12/1987 Clarkson et al. ........ 70/276
4,770,651 A 9/1988 Friedrich ........ 464/38
4,773,240 A 9/1988 Foshee ........ 70/222
4,848,115 A 7/1989 Clarkson et al. ........ 70/278.2
4,854,143 A * 8/1989 Corder et al. ........ 70/218
4,854,459 A 8/1989 DeJonge ........ 215/220
4,920,773 A * 5/1990 Surko, Jr. ........ 70/224
5,010,752 A 4/1991 Lin ........ 70/277
5,040,391 A 8/1991 Lin ........ 70/277
5,040,652 A * 8/1991 Fish et al. ........ 70/189
5,083,122 A 1/1992 Clark ........ 70/278.1
5,279,137 A * 1/1994 Orbell ........ 70/218
5,419,597 A 5/1995 Brackmann et al. ........ 292/201
5,437,174 A 8/1995 Aydin ........ 70/278
5,447,047 A 9/1995 Lin ........ 70/218
5,531,086 A 7/1996 Bryant ........ 70/279
5,542,274 A 8/1996 Thordmark et al. ........ 70/277
5,552,777 A 9/1996 Gokcebay et al. ........ 70/278.3
5,628,216 A 5/1997 Qureshi et al. ........ 70/278.7
5,640,863 A * 6/1997 Frolov ........ 70/283
5,712,626 A 1/1998 Andreou et al. ........ 70/278.1
5,826,450 A 10/1998 Lerchner et al. ........ 70/78.3
5,946,955 A 9/1999 Suggs et al. ........ 70/218
5,960,656 A 10/1999 Yao ........ 70/278.1
5,992,189 A * 11/1999 McCaa ........ 70/149
6,000,609 A 12/1999 Gokcebay et al. ........ 70/277
6,062,612 A 5/2000 Lin ........ 292/144
6,112,564 A 9/2000 Rathmann et al. ........ 70/279.1
6,116,664 A 9/2000 Wegner ........ 292/216
6,286,347 B1 * 9/2001 Frolov ........ 70/472
6,297,725 B1 10/2001 Tischendorf et al. ........ 70/278.1
6,334,348 B1 1/2002 Ming-Chih ........ 70/277
6,357,270 B1 * 3/2002 Vazquez ........ 70/472
6,367,296 B1 4/2002 Dupont ........ 70/257
6,370,928 B1 * 4/2002 Chies et al. ........ 70/278.3
6,374,653 B1 4/2002 Gokcebay et al. ........ 70/278.3
6,418,765 B1 7/2002 Chiu ........ 70/277
6,435,573 B1 8/2002 Szablewski ........ 292/201
6,442,986 B1 9/2002 Russell et al. ........ 70/278.3
6,487,884 B1 12/2002 Constantinou ........ 70/277
6,517,127 B1 * 2/2003 Lu et al. ........ 292/144
6,640,594 B1 * 11/2003 Yao ........ 70/277
6,647,753 B2 * 11/2003 Engler ........ 70/472
6,651,468 B2 * 11/2003 Aramburu et al. ........ 70/222
6,725,693 B2 * 4/2004 Yu et al. ........ 70/107
6,826,935 B2 12/2004 Gokcebay et al. ........ 70/278.3
6,845,642 B2 * 1/2005 Imedio Ocana ........ 70/277
6,854,302 B2 * 2/2005 Zapushek et al. ........ 70/34
6,865,913 B2 3/2005 Yamagishi ........ 70/224
6,895,791 B2 5/2005 Alexander et al. ........ 70/277
7,007,527 B1 3/2006 Zehrung ........ 70/278.7
7,096,698 B2 * 8/2006 Walsh et al. ........ 70/472
2004/0025550 A1 2/2004 Yamagishi ........ 70/278.1
2004/0183652 A1 9/2004 Deng et al. ........ 340/5.53
2007/0051145 A1 * 3/2007 Chang ........ 70/279.1
2007/0137266 A1 * 6/2007 Hsai ........ 70/34
2007/0214848 A1 * 9/2007 Meyerle et al. ........ 70/278.2
2008/0011030 A1 * 1/2008 Ferreira Sanchez et al. ... 70/223
2008/0121001 A1 * 5/2008 Huang et al. ........ 70/91
2009/0025438 A1 * 1/2009 Don et al. ........ 70/224
2009/0027197 A1 * 1/2009 Frolov ........ 340/542

FOREIGN PATENT DOCUMENTS

DE 93 14 065.7 U1 12/1993
DE 297 03 559 U1 6/1997
DE 196 39 545 12/1997
DE 198 54 879 C1 8/2000
DE 100 49 476 A1 4/2002
DE 100 49 477 A1 5/2002
DE 100 65 155 A1 6/2002
DE 101 00 787 A1 7/2002
DE 198 51 308 C2 11/2002
DE 102 12 798 A1 1/2003
DE 102 49 972 A1 5/2004
DE 20 2005 003 764 U1 6/2005
EP 0 588 209 A1 9/1993
EP 0 743 411 11/1996
EP 0 805 905 11/1997
EP 0 976 896 A2 6/1999
EP 1 072 741 1/2001
EP 1 079 050 2/2001
WO WO 98/44224 10/1998
WO WO 2004/020767 3/2004
WO WO 2004/033936 4/2004

OTHER PUBLICATIONS

"Notification of Transmittal of the International Search Report and the Written Opinion of the International Searching Authority", from corresponding application No. PCt/EP2007/003069, dated Nov. 2, 2007.

Office Action from U.S. Appl. No. 12/295,744, mail date of Jul. 3, 2012, 22 pages.

* cited by examiner

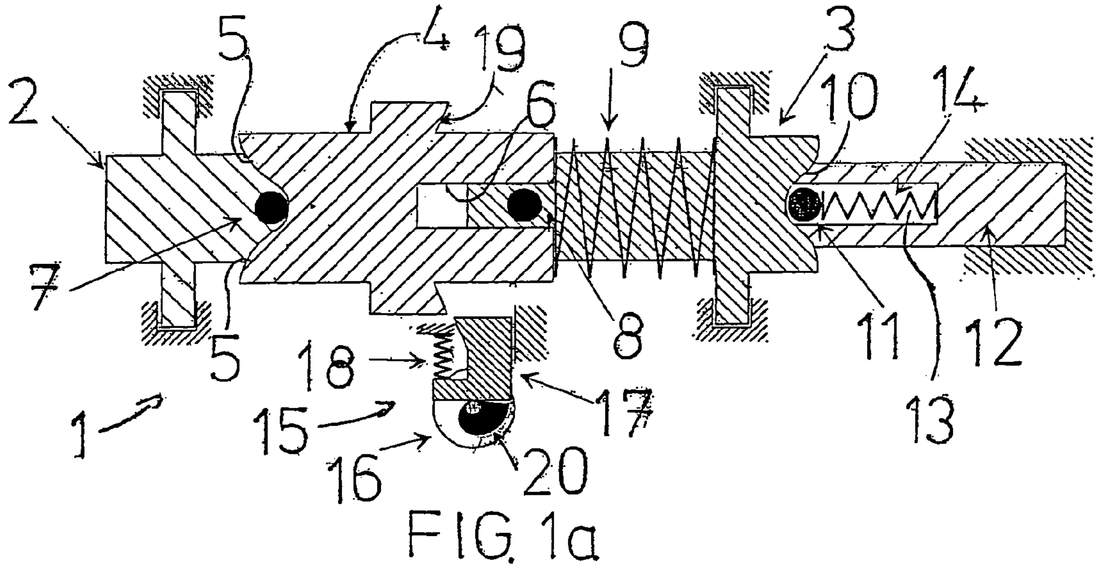
FIG. 1a
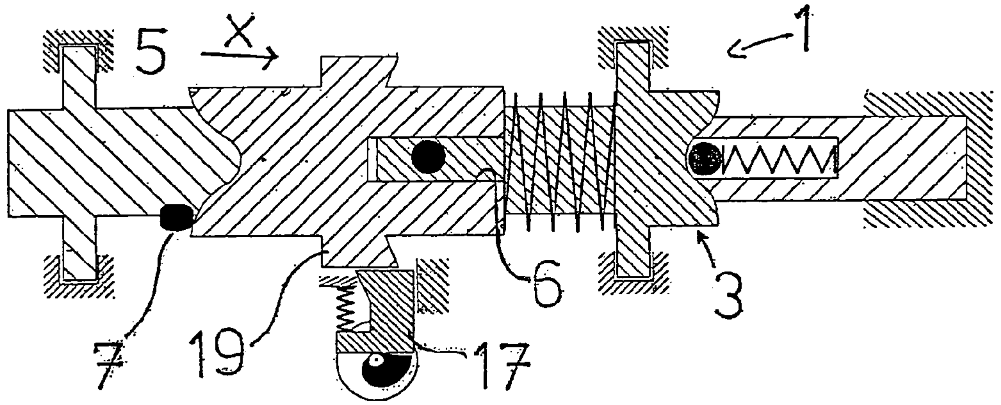
FIG. 1b
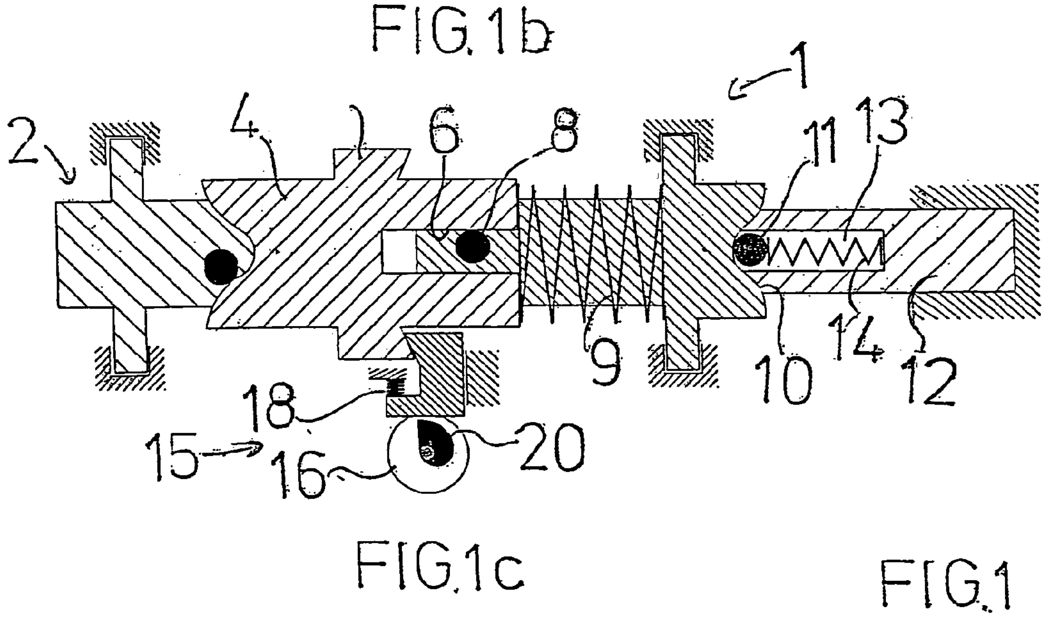
FIG. 1c
FIG. 1

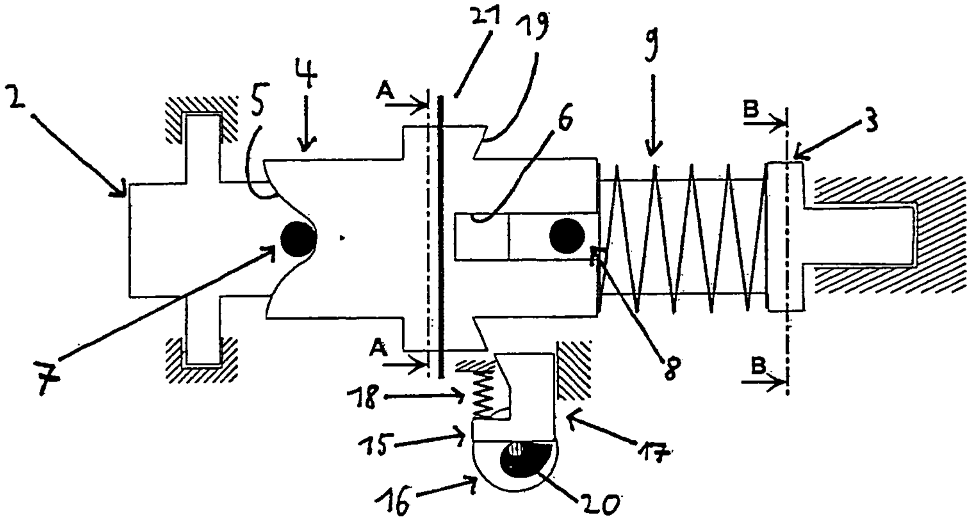
Fig. 2a
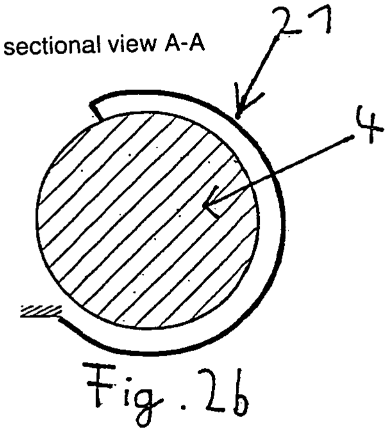
Fig. 2b
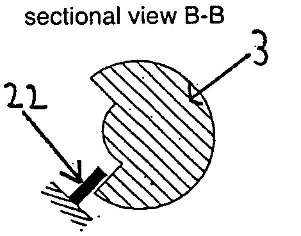
Fig. 2c
Fig. 2

Fig. 4
sectional view C-C
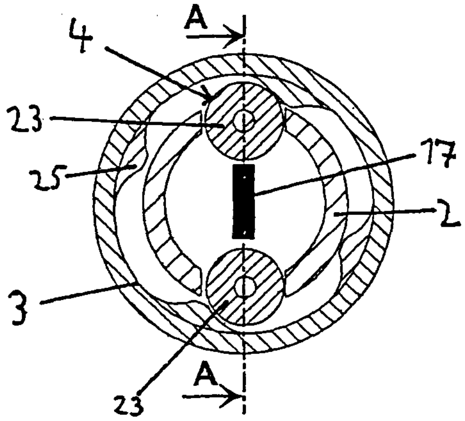
Fig. 4b
sectional view A-A
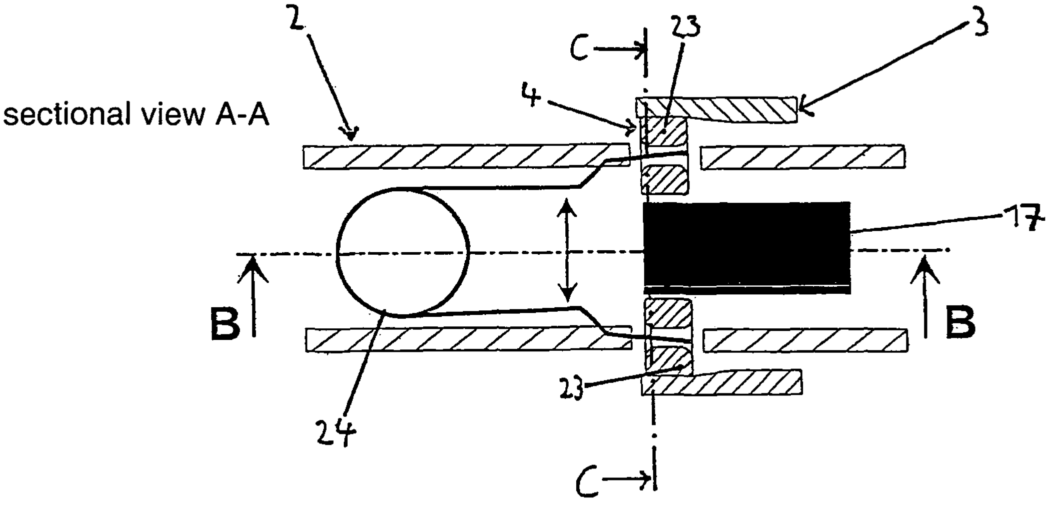
Fig. 4a sectional view B-B
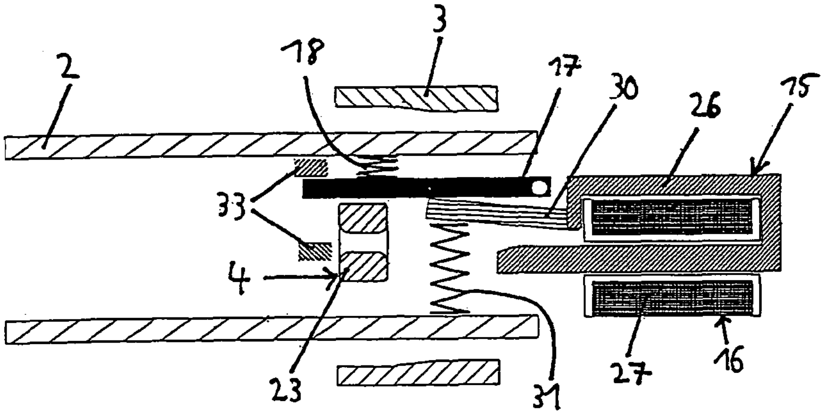
Fig. 5a
sectional view B-B
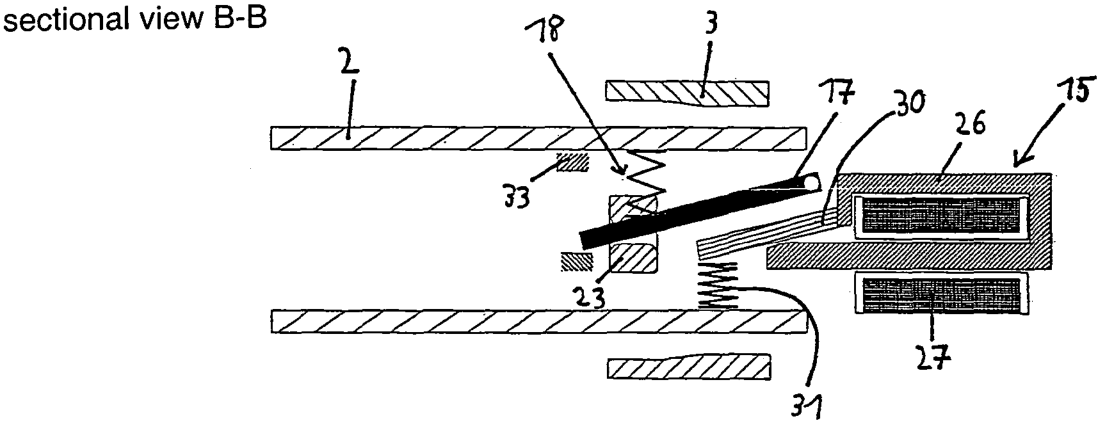
Fig. 5b
Fig. 5

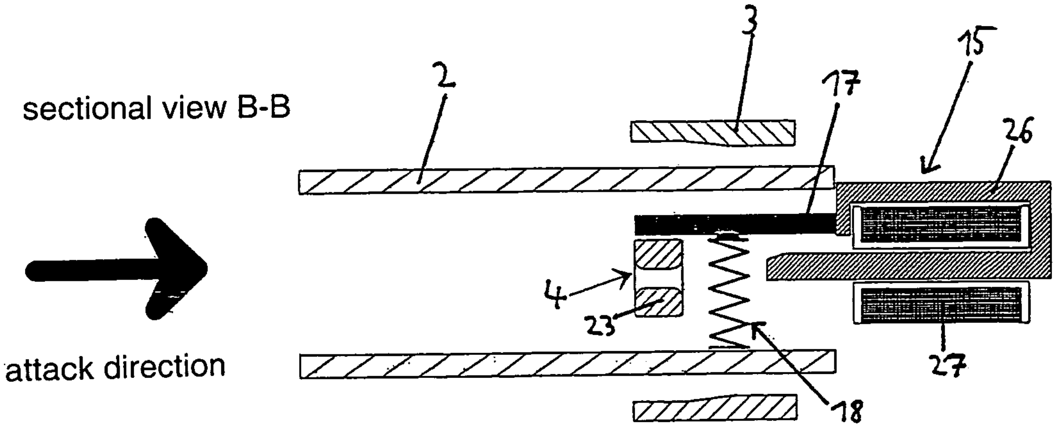
Fig. 6a
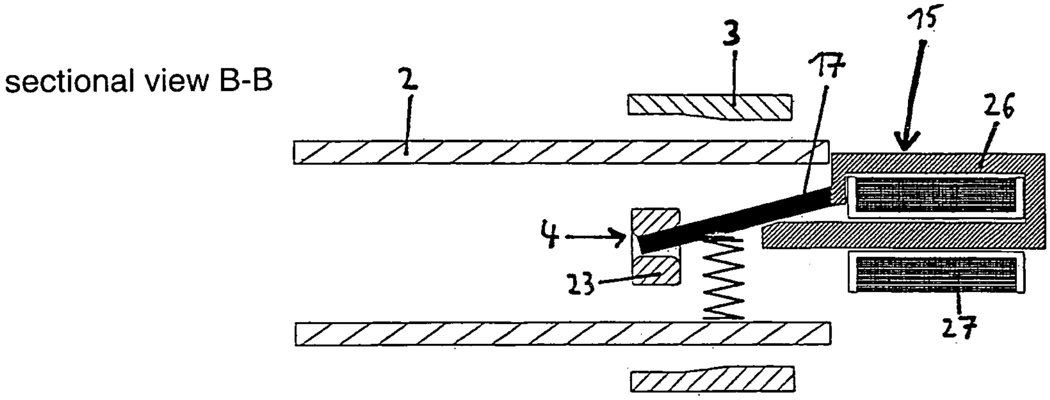
Fig. 6b
Fig. 6

MOVEMENT TRANSMISSION DEVICE AND METHOD

CROSS-REFERENCE TO RELATED APPLICATION

This application is a Section 371 National Stage Application of International Application No. PCT/EP2004/004903, filed May 7, 2004 and published as WO 2004/099640 A2 on Nov. 18, 2004, not in English, the contents of which are hereby incorporated by reference in their entirety.

BACKGROUND OF THE INVENTION

The present invention relates to a device and a method, in particular for transmitting a movement as well as corresponding forces or moments and in particular a rotational movement to a lock, wherein the transmission takes place only in a coupled state but not in a decoupled state.

Devices and methods of this kind are used, in particular, in the field of lock devices such as door or safe locks and the like.

DE-C-37 42 189 discloses a lock cylinder, the coupling of which is connected to the locking bit and can be brought into engagement on one side with a bossed shaft. In order to configure such a lock cylinder in a more simple manner and to achieve better protection against unauthorized use of the lock cylinder, it is proposed that the bossed shaft be enclosed by a locking sleeve which can be displaced axially by the coupling and secured in certain positions.

EP-A-1 072 741 discloses a lock cylinder, in particular an electronic lock cylinder with electromechanical rotational blocking in which the electronic key has opposing electrical terminals on the shaft and the rotatable core of the lock cylinder has an external annular track that is electrically conducting and with its inner face communicates with an electrical contact supported on the terminal whereas the external annular track is supported in the electrical brushes of the external and internal rotors.

EP-A-0 743 411 discloses a lock device in which the key of the lock device comprises a code transmitter formed by a transponder. An actuator, a transponder reading device and a power supply device are arranged in the cylinder housing of the lock cylinder of the lock means. The actuator serves for displacing a locking means which locks or releases the cylinder core and which engages at the circumference of the cylinder core.

EP-A-1 079 050 discloses a lock means comprising a lock bit being blockable by a locking mechanism, wherein a coupling is arranged between the blocking mechanism and the lock bit. The coupling can be separated from only one side of the lock means. The lock means should thus be unlockable from this side without any access authorization for the locking mechanism.

EP-B-0 805 905 discloses a closing mechanism for a door comprising a spindle, an actuating means turning the spindle, a locking element in functional connection with the spindle to lock the door, and a coupling element fitted in the actuating means and acting on the rotation of the spindle. The coupling element moreover has a pin which moves to and fro axially to the spindle and which can be moved to and fro via a spindle by means of a locking element arranged independent of the actuating means via an electric motor drivable by means of an electronic control, in order either to transmit the rotation of the freely rotatable actuating means to the spindle or, in the case of an actuating means being rigidly connected with the shaft, to allow only a slight rotation of the actuating means connected with the shaft. Moreover, a cam is formed on the pin and a spiral spring is clamped as a force storage means between the cam and the spindle of the electric motor, and on the front surface of the actuating means a contact disk is provided via which the electronic control from an electronic information carrier can be controlled via data exchange.

Known devices and methods of this kind prove to be disadvantageous in that relatively much energy is demanded for shifting the coupling or lock element, that forces acting on the coupling element in the coupled and decoupled states cause a load of the lock element and/or that a load of the coupling element or lock element is transmitted to the drive or actuator. In addition to the above-mentioned relatively great energy demand for shifting the coupling, this can result in an increased wear and a reduced functional safety and/or manipulation safety, in particular due to an unreliable leaving of the coupled state in the unloaded state.

SUMMARY OF THE INVENTION

Accordingly, it is the object of the present invention to overcome the disadvantages of the prior art. Further and/or additional objects of the invention include the provision of a device for transmitting a movement and corresponding forces or moments, which can be shifted thereby demanding very little energy, can be shifted by means of a bistable actuator, assures a safe decoupling with a bistable actuator and/or exhibits a high manipulation safety. This/these object(s) is/are achieved with the features of the claims.

In achieving this/these object(s), the invention starts out from the basic idea of providing a device for transmitting a movement as well as corresponding forces and moments, wherein the device comprises a driving mechanism or drive and a take-off mechanism or take-off, wherein the drive and take-off are connected via at least one coupling element in such a manner that at least one coupling element moves in any way upon a relative movement between the drive and the take-off, wherein, however, it cannot transmit the movement of the drive to the take-off because the latter's mechanical potential or the latter's resistance to a specific movement or a specific course of movement or part of movement cannot be overcome. In particular, the drive and take-off are coupled via the at least one coupling element in such a manner that in the decoupled state a movement of the drive causes a movement of at least one coupling element which cannot transmit a movement of the drive to the take-off.

In the coupled state, the coupling is preferably made in that the coupling element is prevented from the movement caused by the relative movement between drive and take-off. Preferably, the drive and take-off are coupled via the coupling element in such a manner that in the decoupled state, a rotational movement of the drive causes an essentially axial and/or radial movement of the coupling element and that a rotational movement of the drive in the coupled state essentially causes a rotational movement of the coupling element. In this regard, an axial and/or radial movement of the coupling element preferably essentially does not cause a movement of the take-off, wherein a rotational movement of the coupling element preferably essentially causes a rotational movement of the take-off. According to a further or additional embodiment, the drive and take-off are coupled via the coupling element preferably in such a manner that in the decoupled state a rotational movement of the drive essentially causes a rotational as well as an axial and/or radial movement of the coupling element and that a rotational movement of the drive in the coupled state essentially causes a rotational movement of the coupling element. Here, a rotational as well as an axial and/or radial movement of the coupling element preferably essentially do not cause a movement of the take-off, wherein a rotational movement, preferably an essentially only rotational movement of the coupling element preferably essentially causes a rotational movement of the take-off. According to a further embodiment, the drive and take-off are essentially moved linearly and are preferably coupled via the coupling element in such a manner that in the decoupled state a movement of the drive causes a movement component or a movement of the coupling element being essentially orthogonal with respect thereto and that a movement of the drive in the coupled state essentially causes a movement of the coupling element in the same direction.

A device according to the invention furthermore preferably comprises a coupling means which can cause a coupling and decoupling of the drive and take-off via the at least one coupling element. According to a preferred embodiment, in the decoupled state the coupling means is essentially not engaged with the coupling element(s). Moreover, in the coupled state the coupling means preferably limits the movability, in particular the axial and/or radial movability of the coupling element or the movability of the coupling element being orthogonal with respect to the movement of the drive and take-off. In a preferred embodiment, the coupling element comprises at least one coupling locking device for limiting the axial and/or radial movability of the coupling element or the movability of the coupling element being orthogonal with respect to the movement of the drive and take-off in the coupled state, at least one actuator for positioning the coupling locking device and/or at least one storage device or resistor for positioning the coupling locking device and/or for storing position information of the coupling locking device. In case of a rotational movement, a movement being orthogonal with respect to this movement means a movement being axial and/or radial with respect to this rotational movement.

The coupling means is preferably configured such that the actuator is suitable for causing a movement or positioning of at least one coupling locking device, for example a coupling locking element, against a resistance of a storage device or resistor, for example via a mechanical potential such as a spring or magnetic force, into a position being suitable with respect to the coupling. In a preferred embodiment, the actuator can be operated mechanically and/or electrically and/or electromagnetically. The actuator is preferably driven by a battery. In a further preferred embodiment, the actuator is pulse-controlled and/or bistable. Furthermore, the actuator can comprise at least one electromagnet for operating a coupling locking device.

In a preferred embodiment, the coupling element and the coupling means are configured such that the coupling can only disengage if a force between drive and take-off falls below a specific minimum value and if the actuator is in a rest position or a position corresponding to the decoupled state.

According to a preferred embodiment, the drive/take-off communicates with at least one coupling element via at least one first guide means. This guide means is preferably configured such that a relative rotation between the coupling element and the drive/take-off preferably causes an essentially axial and/or radial movement of the coupling element with respect to the drive/take-off.

The drive/take-off thus communicates with at least one coupling element via at least one first guide means. Moreover, the coupling element preferably communicates with the drive/take-off via at least one second guide means. The second guide means is preferably configured parallel with respect to an axial and/or radial direction of movement of the coupling element or a longitudinal axis of the device, or essentially causes a correspondingly parallel guidance. The at least one second guide means of the coupling element is preferably configured such that a torque on the coupling element exerts a torque on the take-off/drive but not an axial force.

According to a further preferred embodiment in which the drive and take-off are moved essentially linearly, the drive/take-off communicates with at least one coupling element via at least one first guide means. This guide means is preferably configured such that a relative linear movement between the coupling element and the drive/take-off preferably causes a movement component of the coupling element being orthogonal thereto.

The drive/take-off thus communicates with at least one coupling element via at least one first guide means. Moreover, the coupling element preferably communicates with the take-off/drive via at least one second guide means. The second guide means is preferably configured such that a force in the linear movement direction to the coupling element essentially exerts a force in the same direction to the take-off/drive, but essentially no force being orthogonal thereto.

The take-off has preferably a first resistance or first mechanical potential which has to be overcome so that the take-off can rotate. According to a preferred embodiment, this is caused by at least one resistor or potential arrangement which, via a third guide means and upon a movement of the take-off, sets a resistance or a potential at least in parts of the course of movement against this movement. According to a preferred embodiment, the resistor or potential arrangement is configured as a spring arrangement which is at least partially loaded upon a movement of the take-off at least in parts of the course of movement. In a further preferred embodiment, the mechanical potential which has to be overcome for the movement of the take-off, essentially acts on the coupling element, e.g., via a potential arrangement or a torsion spring.

A movement of the drive causes at least in parts of the course of movement a displacement of the coupling element in orthogonal directions thereto if the mechanical potential which has to be overcome on the take-off is greater than that required for displacing the coupling element. This means that upon a rotation of the drive, the coupling element is moved to and fro but cannot cause a movement of the take-off because it cannot overcome the mechanical potential of the take-off.

Preferably, at least one coupling locking device or coupling locking element can be moved via an actuator (e.g. an electric motor and/or an electromagnet arrangement) such into the engagement region of the coupling element that said coupling element is prevented from an axial and/or radial movement or from a movement being orthogonal with respect to the movement of the drive/take-off. The mechanical interaction between coupling element and coupling locking element is preferably realized such that the coupling element is not prevented from transmitting the usable movement.

Via the second guide arrangement, the movement of the coupling element is transmitted to the take-off, wherein the potential, e.g. the effect of the potential arrangement, can be overcome.

Moreover, the device preferably comprises a further, second resistance or further, second mechanical potential which has to be overcome at least in parts of a relative course of movement between drive and take-off. This mechanical potential is smaller than the first mechanical potential which has to be overcome for moving the take-off. This mechanical potential preferably also leads to the fact that, when the torque exerted on the drive falls below a specific value, the coupling means take(s) a position which essentially allows a forceless movement of the coupling locking device or coupling locking element into and out of the engagement region.

In particular, the cooperation of the coupling locking elements and coupling elements can be realized such that the force applied by the coupling element causes a movement tendency towards a stronger and more reliable engagement, i.e. if there is only a partial engagement at the beginning of the force application, a more reliable position is finally reached in any case.

According to a preferred embodiment, the movement of the coupling element is pulse-controlled; this is particularly preferred in case a battery drive is used. In this case, the drive or take-off is preferably moved in the corresponding positions via corresponding spring mechanisms in the quiescent condition. The actuator and coupling locking device or coupling locking element are preferably coupled via a spring element so that, for example, a once given electrical pulse to the actuator is mechanically temporarily stored until the coupling element is in a suitable position. This applies both to coupling and/or decoupling. It is thus particularly assured that the desired condition is achieved independent of the mechanical status.

According to preferred embodiments, the coupling means is resistant to manipulation. The coupling means is preferably shock or impact resistant. This can preferably be achieved in that the essential movement directions of the coupling means are essentially orthogonal with respect to the expected shock directions. A further preferred embodiment provides for counter moments which compensate the forces caused by the shock.

In accordance with a method according to the invention, in particular for transmitting a movement and corresponding forces and moments by means of a coupling, the realization and/or arrangement of corresponding elements and/or their movements, as described in connection with a discussion of the devices according to the invention, as well as the transmission or coupling of a movement and corresponding forces and movements takes place by means of a device according to the invention.

The application in lock devices or lock mechanisms, in particular electrical and/or transponder-controlled lock devices is advantageous. In particular, an electronic position detection of the coupling locking element is possible, and the actuator can be controlled on the basis thereof.

In the following, a device according to the invention and a method according to the invention are described in more detail on the basis of a preferred embodiment and with reference to the drawings in which

BRIEF DESCRIPTION OF THE DRAWINGS

FIG. 1 is a partial sectional side view of a device according to the invention, wherein FIG. 1*a* is a side view of the device according to the invention without a force being applied to the drive and take-off;

FIG. 1*b* is the device according to the invention in the decoupled state during rotation of the drive;

FIG. 1*c* is the device according to the invention in the coupled state during rotation of the drive; and FIG. 2 is a further preferred embodiment of the device according to the present invention, wherein FIG. 2*a* is a partial sectional side view of the device according to the invention without a force being applied to the drive, FIG. 2*b* is a sectional view A-A of the coupling element, and FIG. 2*c* is a sectional view B-B of the take-off, FIG. 4 is a further preferred embodiment of the device according to the invention, wherein FIG. 4*a* is a sectional view A-A of the device according to the invention in the coupled state during rotation of the drive, FIG. 4*b* is a sectional view C-C of the device according to the invention in the coupled state during rotation of the drive, FIG. 5 is a further preferred embodiment of the device according to the invention, wherein FIG. 5*a* is a sectional view B-B of the device according to the invention in the decoupled state during rotation of the drive, and FIG. 5*b* is a sectional view B-B of the device according to the invention in the coupled state during rotation of the drive, and wherein FIG. 6 is a further preferred embodiment of the device according to the invention, wherein FIG. 6*a* is a sectional view B-B of the device according to the invention in the decoupled state during the rotation of the drive, and FIG. 6*b* is a sectional view B-B of the device according to the invention in the coupled state during rotation of the drive.

DETAILED DESCRIPTION OF ILLUSTRATIVE EMBODIMENTS

Figure 3:
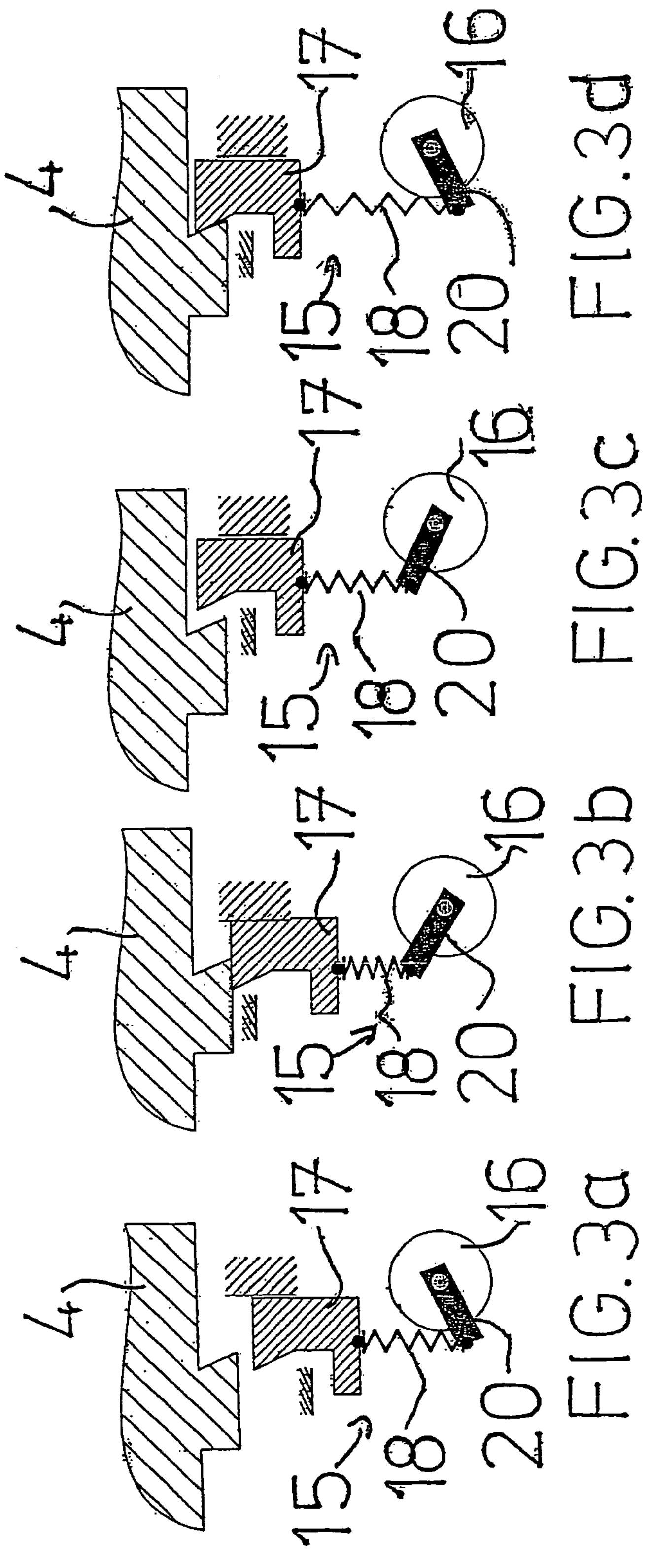
FIG. 3 is a further preferred embodiment of a coupling device to be used with a device according to the invention or a method according to the invention.

FIG. 1 shows a preferred device 1 according to the invention for transmitting a movement and corresponding forces and moments, wherein the device 1 comprises a drive 2 and a take-off 3. Drive 2 and take-off 3 communicate via a coupling element 4 or are coupled therewith. The coupling element 4 and the drive 2 and take-off 3 are configured such that in the decoupled state a relative movement between the drive 2 and the take-off 3 causes a movement of the coupling element 4 which is not suitable for transmitting a movement of the drive 2 to the take-off 3.

For this purpose, the coupling element 4 preferably comprises at least a part of a first and/or second guide means, i.e. at least one first slide surface 5 and at least one second slide surface 6 which respectively communicate with at least a part of the first guide means arranged at the drive 2, i.e. at least one first slide element 7, and at least a part of the second guide means arranged at the take-off 3, i.e. at least one second slide element 8. The slide surfaces 5 and 6 and the guide elements 7 and 8 are preferably configured and/or arranged such that in the decoupled state a rotational movement of the drive 2 causes an essentially axial movement of the coupling element 4, wherein the axial movement of the coupling element 4 essentially does not cause a movement of the take-off 3. Moreover, a rotational movement of the drive 2 in the coupled state preferably essentially causes a rotational movement of the coupling element 4, which in turn preferably essentially causes a rotational movement of the take-off 3.

For this purpose, the at least one first slide surface 5 is preferably inclined with respect to an axial movement direction of the coupling element 4. In a further preferred embodiment, the at least one first slide surface 5 is inclined with respect to a longitudinal axis of the device 1. Moreover, the at least one first slide surface 5 has preferably at least partially one or more radius(es). In a preferred embodiment according to the representation in FIG. 1, the at least one first slide surface 5 is formed as an indentation having radiuses. Preferably, the radius and/or gradient of the at least one first slide surface 5 vary along its length in order to cause a defined transmission of a movement and/or force or moment when the at least one first slide element 7 slides along and/or contacts the first slide surface 5.

The at least one first slide element 7 is preferably arranged at the drive 2 in such a manner that when it is rotated, it essentially moves on a plane being approximately perpendicular with respect to an axial movement direction of the coupling element 4 or a longitudinal axis of the device. In this regard, it preferably contacts at least one first slide surface 5 of the coupling element 4 and/or slides along it.

The at least one second slide surface 6 being arranged at the coupling element 4 for contacting the at least one second slide element 8 arranged at the take-off 3 is preferably essentially configured parallel with respect to an axial movement direction of the coupling element 4 or with respect to a longitudinal axis of the device 1. The at least one second slide element 8 is preferably arranged such that when the coupling element 4 or the take-off 3 is rotated, it is moved essentially on a plane being perpendicular with respect to an axial movement direction of the coupling element 4, a rotational axis of the take-off 3 and/or a longitudinal axis of the device 1, wherein it contacts at least one second slide surface 6 and/or slides along it.

In a preferred embodiment, the at least one second slide surface 6 is formed by a recess in the coupling element 4, particularly preferably by an essentially rectangular recess, as shown in FIG. 1.

In a preferred embodiment, the slide surfaces and slide elements and their arrangements consisting of drive, take-off and coupling element are interchanged.

The shown embodiment moreover comprises a coupling spring 9 being arranged between the coupling element 4 and the take-off 3, wherein it pre-stresses the coupling element 4 with respect to the drive 2 and/or take-off 3. The coupling spring 9 preferably presses the coupling element 4 or at least one first slide surface 5 against at least one first slide element 7.

According to a further preferred embodiment, the take-off 3 comprises at least a part of a third guide means with at least one third slide surface 10. The at least one third slide surface 10 is preferably inclined or sloped with respect to a rotational axis of the take-off 3, an axial movement direction of the coupling element 4 and/or a longitudinal axis of the device 1. According to further or additional preferred embodiments of the at least one third slide surface 10, it is referred to the discussion of the at least one first slide surface 5.

The device 1 furthermore preferably comprises at least a part of a third guide means, namely at least one third slide element 11 for contacting the at least one third slide surface 10 arranged at the take-off 3. The at least one third slide element 11 is preferably arranged on a guide 12, wherein at least a third slide element 11 is preferably arranged in a guide groove 13 formed in the guide 12. According to a preferred embodiment, the guide 12 or guide groove 13 prevents a displacement of the at least one third slide element 11 along a plane being approximately perpendicular with respect to the rotational axis of the take-off 3, the axial movement direction of the coupling element 4 and/or the longitudinal axis of the device 1. Particularly preferably, the guide 12 or guide groove 13 guarantees only a displacement of the at least one third slide element 11 along a rotational axis of the take-off 3, an axial movement direction of the coupling element 4 and/or a longitudinal axis of the device 1. Moreover, the device 1 comprises a potential spring 14 being arranged on the guide 12 and causing a pre-stressing of the at least one third slide element 11 with respect to the take-off 3. According to a preferred embodiment, as shown in FIG. 1, at least one third slide element 11 is in contact with at least one third slide surface 10, wherein it is pre-stressed with respect thereto by the potential spring 14. Here, the potential spring 14 presses the slide element 11 against the slide surface 10. Such an arrangement causes a mechanical potential of the take-off which has to be overcome so that the take-off can be rotated.

According to further preferred embodiments, the guide 12, potential spring 14 and third slide surface(s) 10 are preferably arranged essentially perpendicular with respect to a rotational axis of the take-off 3, an axial movement direction of the coupling element 4 and/or a longitudinal axis of the device 1. Thus, it is possible to reduce the axial length of the device thereby achieving the same effect.

Moreover, the device preferably comprises a coupling means or coupling mechanism 15, which, in a preferred embodiment according to the representation in FIG. 1, comprises an actuator 16, a coupling locking device or coupling locking element 17 as well as a storage device or resistor, here the coupling locking spring 18.

The coupling means 15 is preferably configured or arranged such that the coupling locking element 17 can essentially take two positions, wherein one position causes a decoupled state of the device 1 (FIG. 1*a*, FIG. 1*b*) and a further position causes a coupled state of the device (FIG. 1*c*). Thus, the coupling means 15 can cause a coupling and a decoupling of the drive 2 and the take-off 3 via the coupling element 4. Here, the respective state depends on the position of the coupling means 15.

The coupling means 15 is preferably configured such that in the decoupled state the coupling locking device or coupling locking element 17 is not engaged with the coupling element 4 and wherein in the coupled state the coupling means 15 or coupling locking element 17 is arranged such with respect to the coupling element 4 that the movement of the coupling element 4 is limited. According to a preferred embodiment, the coupling element 4 comprises at least one coupling portion 19 which is preferably configured as a projection and particularly preferably as a peripheral projection. For generating a coupled state, the actuator 16 positions the coupling locking element 17 such with respect to the coupling element 4 that it essentially limits or prevents an axial movement of the coupling element 4. Particularly preferably, the coupling means 15 or coupling locking element 17 prevents an axial movement of the coupling element 4 by means of an engagement with at least one coupling portion 19.

The coupling means 15 is preferably configured such that the actuator 16 positions the coupling locking element 17 against the coupling locking spring 18 in the position being suitable for the coupling. Here, the coupling means 15 is preferably configured such that without the influence of energy, i.e. in particular without an action of the actuator 16, the device 1 is in the decoupled state. Preferably, in the otherwise unloaded state, the coupling locking spring 18 causes a positioning of the coupling locking element 17 in the decoupled state. By actuating the actuator, the coupling locking element can be brought, against the spring force of the coupling locking spring 18, in the position being suitable for coupling.

For this purpose, the coupling locking element 17 is preferably moved in the engagement area of the coupling element 4 or a coupling portion 19. In a preferred embodiment, as shown in FIG. 1, the actuator is formed by an electric motor which preferably has an eccentric disk 20 by means of which a displacement of the coupling locking element 17 is caused when the actuator is rotated. Here, a movement of the coupling locking element 17 caused by the actuator is only necessary when it is intended to change the state from the decoupled state into the coupled state. The change from the coupled state into the decoupled state is caused by the spring force of the coupling locking spring 18. As an alternative with regard to the electromotor, it is also possible that the actuator 16 is formed by an electromagnet arrangement comparable to the electromagnet arrangement shown in FIG. 4 which will be discussed in detail in the following.

For a further description of the effects of the coupled and decoupled states of the device, it is particularly referred to FIGS. 1*b* and 1*c*, respectively. If the device 1 is in the decoupled state (FIG. 1*b*), a relative movement between drive 2 and take-off 3—here a rotation of the drive 2 is shown—does not cause a movement of the take-off 3, in particular because its mechanical potential cannot be overcome. The drive 2 communicates with the coupling element 4 via a first slide element 7 and a first slide surface 5. If the drive 2 is rotated, due to the inclined slide surface of the coupling element 4, the drive is displaced in the axial direction against the force of the coupling spring 9. Here, axial and radial force components are transmitted to the coupling element 4 via the at least one first slide element 7. The axial component causes a displacement of the coupling element in the direction shown by arrow X. Such a displacement of the coupling element 4 does not cause a transmission of a movement to the take-off 3, because the at least one second slide element 8 being arranged on the take-off 3 contacts or moves along the second slide surfaces 6 being arranged essentially parallel with respect to the axial movement direction of the coupling element 4, wherein the second slide surfaces 6 do not transmit a movement or force via the at least one second slide element 8 to the take-off 3. In practical application, a radial force, which causes a torque on the coupling element 4, continues to act on the coupling element 4 due to the inclination of the at least one first slide surface. Thus, the coupling element 4 tends to rotate around its axial displacement direction, wherein at least one of the second slide surfaces 6 acts on at least one second slide element 8 so that a force, which is perpendicular in the representation, acts on the second slide element 8 or a torque is transmitted to the take-off 3. Here, the transmitting torque is so low that it is not able to overcome the mechanical potential of the take-off 3 being directed against a rotational movement of the take-off 3. Accordingly, in the decoupled state the coupling element 4 is moved in the axial direction due to a rotation of the drive 2 if the force generated by the rotation of the drive 2 and acting on the coupling element 4 is greater than the force generated by the coupling spring 9 and countering the axial displacement of the coupling element 4, wherein, however, no rotational movement of the take-off is caused because its mechanical potential cannot be overcome.

If the device is coupled, i.e. the coupling locking element 17 is moved via the eccentric 20 of the actuator 16 against the force of the coupling locking spring 18 into the engagement area of the coupling element 4, it prevents an axial movement of the coupling element 4 due to an engagement with the coupling element 4 or with the coupling portion 19. If the drive 2 is rotated, the coupling locking element 17 prevents the coupling element 4 from an axial displacement but not from a rotation, so that the rotation of the drive 2 via at least one first slide element 7 and at least one inclined slide surface 5 is transmitted or changed into a rotational movement of the coupling element 4. The prevention of an axial movement of the coupling element 4 thus essentially prevents a sliding of the slide element 7 along a slide surface 5, so that the rotational movement of the drive 2 is transmitted to the coupling element 4 (FIG. 1*c*). The rotational movement of the drive 2 is then transmitted to the take-off 3 via the coupling element 4 or the slide element 7, slide surface 5, slide surface 6 and slide element 8. Since the torque used for the rotational movement of the drive 2 is not converted into an axial displacement of the coupling element 4 but transmitted via the coupling element 4 to the take-off 3, the effect or resistance of the potential arrangement can be overcome, and thus the take-off 3 can be rotated. The coupling locking element 17 thus prevents or hinders an axial movement of the coupling element 4 but does not prevent or hinder a rotation thereof because the axial counter-force is transmitted via the slide surface 5.

In a preferred embodiment, the coupling locking element 17 and/or the coupling element 4 or coupling portion 19 is configured such that forces of the coupling element 4 acting on the coupling locking element 17 cause a relief of the actuator. Here, the contact surfaces of the coupling locking element 17 and coupling element 4 or coupling portion 19 are preferably inclined such that an axial force of the coupling element 4 acting on the coupling locking element 17 causes a movement tendency of the coupling locking element towards a stronger and more reliable engagement, so that at the beginning of the force application there is only a partial engagement, but then in any case an essentially reliable position is reached and moreover it is assured that the coupling locking element 17 is locked in the coupled state and its return to the decoupled state is prevented as long as the torque, which is transmitted from the drive to the take-off, does not fall below a predetermined value. In further preferred embodiments, the contact surfaces of the coupling locking element 17 and the coupling element 4 or coupling portion 19 have further configurations differing from the shown surface geometries, wherein, however, they fulfill the functions described above.

After rotation of the drive 2 and displacement of the coupling element 4, the coupling spring 9 and/or potential spring 14 preferably cause a return of the individual elements, i.e. drive 2, coupling element 4 and/or take-off 3 into the starting positions (cf. FIG. 1*a*). As shown in FIG. 1, in a preferred embodiment, the drive 2, take-off 3 as well as guide 12 and coupling means 15 are supported such that an axial displacement, i.e. in the direction of or opposite to the direction of arrow X in FIG. 1*b* is prevented or essentially limited.

In preferred embodiments, the first, second and third slide elements 7, 8 and 11, as well as the first, second and third slide surfaces 5, 6 and 10 are arranged outside the rotational axis of the device 1. According to a further or additional preferred embodiment, the drive 2, coupling element 4, take-off 3 and/or guide 12 are essentially symmetrical and/or rotationally symmetrical. According to a further preferred embodiment of the invention, the actuator 16 is driven by a battery and, according to a further or additional preferred embodiment, pulse controlled. According to a further embodiment, the actuator is configured in a manner different from that described but suitable for fulfilling the described functions.

In a further embodiment of the device according to the invention, as shown in FIG. 2, i.e. FIGS. 2*a*-2*c*, a mechanical potential, which has to be overcome for moving the take-off, acts on the coupling element 4 by means of a spring element 21, e.g., a torsion spring or a potential arrangement. This embodiment differs from the embodiment shown in FIG. 1, i.e. FIGS. 1*a*-1*c* in that the take-off 3 does not necessarily comprise a mechanical potential, as this is essentially transmitted to the coupling element by the torsion spring 21. The rotation angle of the take-off 3 can be limited by the cooperation of the take-off 3 with a stop 22, wherein FIG. 2*c* shows the rest position.

As described above, in the decoupled state the coupling element 4 is moved in axial direction by a rotation of drive 2, if the force acting on coupling element 4 and being generated by the rotation of the drive 2 is greater than the force generated by the coupling spring 9 and countering against the axial displacement of the coupling element 4. However, no rotational movement of the take-off 3 is caused as the mechanical potential of the coupling element 4 generated by the spring element 21 cannot be overcome.

As described above, in the coupled state in contrast a rotational movement of the drive 2 causes preferably essentially a rotational movement of the coupling element 4, the rotational movement being transmitted to the take-off 3 as the mechanical potential generated by the torsion spring 21 can now be overcome.

FIG. 3 shows a further preferred embodiment of a coupling means 15 for use with a device, for example a device as shown in FIG. 1 or FIG. 2 and described above. Here, we only deal with the features which are different from that of the embodiment described above. FIG. 3 shows a coupling means 15 for coupling a coupling element 4 with an actuator 16, an eccentric 20, a coupling locking means or coupling locking element 17 as well as a storage means or resistor, here the coupling locking spring 18. FIG. 3*a* shows the actuator 16 or eccentric 20 in a neutral or decoupled position, the coupling locking element 17 is also in a decoupled position. FIG. 3*b* shows the actuator 16 in a coupled position, wherein the position of the coupling element 4 prevents the coupling locking element 17 from being coupled. In this case, the position information or positioning energy for positioning the coupling locking element 17 in the coupled position is stored in the coupling locking spring 18. If the coupling element 4 moves into a position allowing a coupling, as shown in FIG. 3*c*, the coupling locking spring 18 positions the coupling locking element 17 in the coupled position due to the stored energy. The position of the actuator 16 remains unchanged. In the reverse, FIG. 3*d* shows the coupling locking element 17 in the coupled position, i.e. in engagement with the coupling element 4, wherein the actuator 16 is in a neutral or decoupled position. In this case, too, the position information or positioning energy for the positioning of the coupling locking element 17 is stored in the coupling locking spring 18. If the coupling element 4 is moved in a position allowing a decoupling, the coupling locking spring 18 positions the coupling locking element 17 in the neutral or decoupled position, as shown in FIG. 2*a*, because of the stored energy.

It can be taken from the embodiments described above that the devices according to the invention are preferably resistant to manipulation. A further resistance to manipulation is, for example and preferably achieved in that the coupling locking element 17 is supported in the direction of the longitudinal axis of the device and arranged perpendicularly as well as in that the actuator 16 is arranged transversely with respect to the longitudinal axis of the device. In case of an impact or shock in the longitudinal direction of the device, for example if the device is used as a lock device in case of an impact against the latter, due to such an arrangement there is no or only a slight force acting on the actuator 16 which would be suitable to displace the actuator, as well as there is no or only a slight force acting in the coupling or decoupling direction of the coupling locking element 17.

According to a further preferred embodiment, the device and method are realized such that an axial and/or radial movement of the drive via a corresponding arrangement of the individual elements causes an axial and/or radial movement of the take-off, wherein the movement of the drive to the take-off can be correspondingly coupled by means of at least one coupling element. Further preferred embodiments can be achieved by combining different preferred embodiments. Moreover, a plurality of devices can be connected with each other, for example, they can be arranged in line, or they can have one or several drives, take-offs, coupling elements, guide devices, coupling means, etc. which are connected or communicate with each other.

In further preferred embodiments, translatory instead of rotational movements are accordingly coupled.

In accordance with a method according to the invention, a movement as well as corresponding forces and moments are transmitted in accordance with the described functioning of a device according to the invention, and in a further preferred method by the use of a device according to the invention.

Figure 4C:
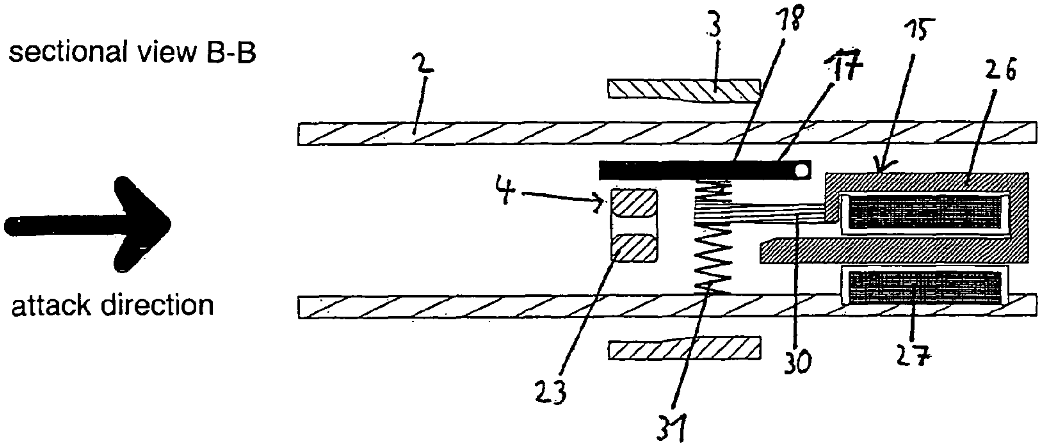
FIG. 4*c* is a sectional view B-B of the device according to the invention in the decoupled state during rotation of the drive.
Figure 4D:
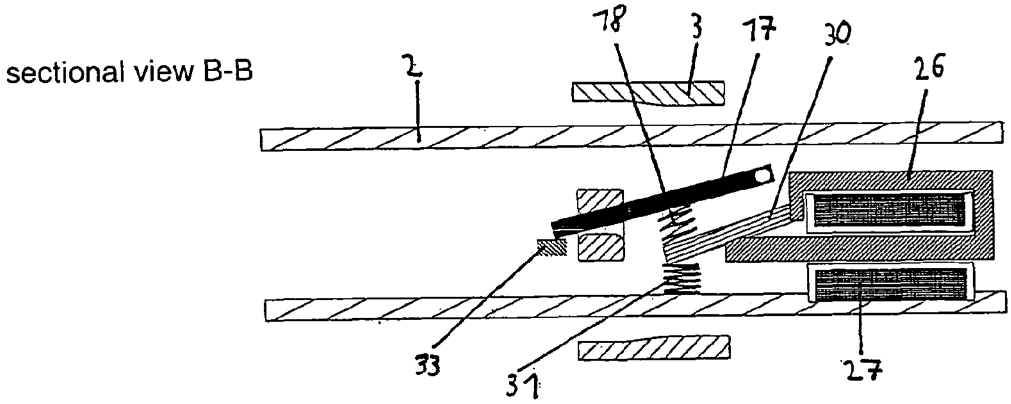
FIG. 4*d* is a sectional view B-B of the device according to the invention in the coupled state during rotation of the drive.

A further or additional embodiment according to the present invention is shown in FIG. 4, i.e. FIGS. 4*a*-4*d*. Here, the coupling element 4 comprises a plurality of elements 23, e.g. in form of reels, which are guided in the drive 2 such that the reels essentially move only in the direction being radial with respect to the drive, as shown, e.g. in FIGS. 4*a* and 4*b*.

In FIGS. 4*a*, 4*c*, 4*d* as well as in FIGS. 5*a*, 5*b*, 6*a* and 6*b* to be discussed in the following, it is to be noted that, for reasons of better overview, the coupling element in form of a reel 23 is shown in a sectional view but is arranged above the actual section plane. Furthermore, for reasons of better overview the sections are made as thin layers.

In the view shown in FIG. 4*a*, the actuator in form of an electromagnet is furthermore omitted for reasons of better overview. Furthermore, in FIGS. 4, 5 and 6, no mechanical potential arranged at the drive has been indicated for reasons of better overview.

The reels 23 are pressed outwards in the direction of the take-off 3 by a spring element 24, e.g. consisting of a leg spring. The take-off 3 is configured such that the reels or roller elements 23 preferably roll on radial projections 25 formed at the inside of the take-off 3 and thus have to give way inwards in case of a relative movement between drive 2 and take-off 3 whereby they have to overcome the potential of the spring element 24. However, the reels are not able to overcome the mechanical potential of the take-off 3 so that in the decoupled state if the drive 2 rotates essentially no rotation of the take-off 3 is caused, as the mechanical potential of the take-off is not overcome. For reasons of simplicity, the mechanical potential of the take-off 3 is not shown in FIGS. 4*a*-4*d*.

Moreover, as a coupling mechanism 15 the device comprises an actuator 16 having an electromagnet arrangement, a rotatable coupling locking element 17 having a coupling locking spring 18 as well as a switch element 30 and a switch element spring 31.

The coupling means 15 is preferably configured such that the coupling locking element 17 can essentially take two positions, wherein one position causes a decoupled state of the device 1 (FIG. 4*c*) and a further position causes a coupled state of the device (FIGS. 4*a*, 4*b*, 4*d*). Thus, the coupling means 15 can cause a coupling and decoupling of the drive 2 with the take-off 3 via the coupling element 4, here in form of reels 23. Here, the respective state depends on the position of the coupling means 15.

In the coupled state, as shown in FIGS. 4*a*, 4*b* and 4*d*, the coupling locking element 17 is located between the reels 23 so that these can no longer give way and a torque can be transmitted to the take-off 3. This is achieved in that a current is led over a coil 27, which causes a magnetic flux through the yoke 26 and the switch element 30, which is preferably at least partially magnetically permeable. Said flux causes an attracting force in the air gap between yoke 26 and switch element 30, said force compressing the switch element spring 31 of the switch element. Thereby, the coupling locking element 17 being connected to the switch element 30 via the coupling locking spring 18, is moved to the middle in such a manner that the drive and the take-off are coupled with each other.

Here, it is an advantage, that in the coupled state no friction occurs, as the radially acting counterforce is eliminated by the symmetric configuration of the embodiment.

For decoupling, the switch element 30 is released from the electromagnet arrangement 26, 27 so that the switch element spring 31 moves the coupling locking element 17 back into its rest position. The decoupling can be supported by a stop 33 in that said stop limits the path of the coupling locking element 17 such that the coupling locking spring 18 is pre-stressed when the switch element 30 is attracted. When, for the decoupling, the magnet force is removed from the switch element 30 for a short period of time, said switch element can detach somewhat from its stop at the yoke 26 due to the pre-stressed coupling locking spring 18 even if the coupling locking element 17 is still clamped between the coupling elements 4 due to an external torque acting on the drive 2.

A further or additional embodiment is shown in FIG. 5, i.e. FIGS. 5*a* and 5*b*. This embodiment is essentially identical to the embodiment shown in FIG. 4 and mainly differs from the latter in the configuration of the coupling means 15.

In the coupling means 15, the coupling locking element 17 and the switch element 30 moved by the actuator 16 are configured separately. In the decoupled state, the switch element 30 is forced against the coupling locking element 17 and its coupling locking spring 18 by the switch element spring 31, as shown in FIG. 5*a*. As the coupling locking spring 18 is preferably weaker than the switch element spring 31, the coupling locking element 17 is forced against a stop 33.

In order to couple drive 2 and take-off 3 with each other, the switch element 30 is operated by the actuator 16. Here, the switch element 30 is attracted by the activated electromagnet 26, 27 so that the coupling locking spring 18 is able to move the coupling locking element 17 towards the middle into a coupled position. In said state, the coupling locking element 17 and the switch element 30 are preferably not in direct mechanical contact. Thus, the decoupling is supported: If, for decoupling, the magnetic force is removed from the switch element 30 for a short period of time, for the distance to the coupling locking element 17 said element can detach somewhat from the stop at the yoke 26 due to the pre-stressed switch element spring 31, even if the coupling locking element 17 is still locked between the coupling elements 4 due to an external torque acting on the drive 2.

A further preferred embodiment of the device according to the invention is shown in FIG. 6, i.e. FIGS. 6*a* and 6*b*. This embodiment is essentially identical to the embodiment shown in FIG. 4 and mainly differs from the latter in the configuration of the coupling means 15. The coupling means 15 is configured such that instead of the switch element 30 and the switch element spring 31, the coupling locking element 17 and its coupling locking spring 18 are directly operated by the actuator 16.

The coupling locking element 17 and/or the switch element 30 are supported rotatably and/or displaceably wherein the movement necessary for the coupling is essentially perpendicular to the attack direction, as shown in FIGS. 4 to 6. It is an advantage of the above-mentioned embodiments, that they are particularly manipulation resistant therefore. Thus, manipulatively introduced acceleration in the attack direction essentially cannot cause a movement of said element into the coupled position.

In a rotatable embodiment of the coupling locking element 17 and/or the switch element 30, the center of mass of said elements can be supported in their rest position (decoupled) relatively to their rotation axis such that in case of accelerations which have essentially the direction of the direction of attack, no coupling can be caused. For example, this can preferably be achieved in that the connection line between center of mass and rotation center is essentially parallel to the direction of attack.

A further advantage of the embodiments according to FIGS. 4 to 6 is that the movement for coupling is directed towards the middle so that also centrifugal forces cannot be used for manipulations.

The effective direction of the magnetic field (or fields) between the coupling locking element 17 or the switch element 30 and the yoke 26, said field(s) being generated by the coil 27, is essentially transversal to the direction of attack. This is advantageous in that external manipulative magnet field cannot be effective in this direction, they will essentially cause a repulsion of the coupling locking element 17 or the switch element 30 away from the yoke 26.

It is to be noted that besides the embodiments described above in which roller elements are used as coupling elements, it can also be thought of embodiments having only one roller element 23 or sliding element or having more than two roller elements 23 or sliding elements as well as combination of roller and sliding elements.

According to further preferred embodiments, the different described preferred embodiments can be combined arbitrarily and interchanged, wherein, for the sake of clarity, not all alternative embodiments are discussed in detail herein.

The device according to the invention and the method according to the invention are particularly suitable for being used in the field of lock devices and lock mechanisms. The device according to the invention and the method according to the invention particularly allow the coupling of a drive and take-off thereby demanding very little energy, wherein particularly a safe decoupling with an essentially unloaded drive is guaranteed. Moreover, the coupling can be shifted by means of a bistable actuator and allows a safe decoupling with a bistable actuator. The actuator can comprise an electro motor or a magnet element, e.g. an electromagnet element arrangement. Moreover, in a preferred embodiment, the device according to the invention and the method according to the invention allow a decoupling only in case a force or moment, which is present between the drive and take-off, falls below a predetermined value. Here, the coupling process can preferably be controlled in an almost forceless manner. Moreover, in the device according to the invention and the method according to the invention, forces applied by the coupling element to the coupling mechanism preferably cause a relief of the actuator, so that independent of the mechanical status between drive and take-off, a safe return of the actuator into the decoupled state becomes possible. Thus, the device according to the invention and the method according to the invention cause a simple, functionally reliable and manipulation-resistant transmission of a movement as well as corresponding forces and moments by means of a coupling. A further or additional advantage of the present invention resides in an improved manageability and an improved rotational feeling, in particular because of the provision of a comparable lock force or a force counteracting the lock force in the decoupled as well as the coupled states.

What is claimed is:

1. A device for transmitting a movement as well as corresponding forces and/or moments, the device comprising:

a drive, a take-off and two coupling elements, wherein the drive and the take-off are coupled by the coupling elements in such a manner that;

(i) in a decoupled state a rotational movement of the drive causes movement of the coupling elements, wherein movement of the coupling elements is not suitable for transmitting movement from the drive to the take-off, and wherein in the decoupled state rotational movement of the drive causes the coupling elements to move radially and orthogonally with regard to said rotational movement of the drive, (ii) wherein in the coupled state a moveable coupling locking element is located between the coupling elements so that the coupling elements can no longer move radially such that rotational movement of the drive causes rotational movement of the coupling elements in a same direction together with the take-off, further comprising an actuator for positioning the coupling locking element, wherein the actuator is bistable, wherein a mechanical potential formed by a storage device, has to be overcome for moving the coupling locking element from the decoupled state in a coupled state and/or from the coupled state in the decoupled state.

2. A device, for transmitting a movement as well as corresponding forces and/or moments, the device comprising:

a drive, a take-off and two coupling elements, wherein the drive and the take-off are coupled by the coupling elements in such a manner that, (i) in a decoupled state a rotational movement of the take-off causes movement of the coupling elements, wherein movement of the coupling elements is not suitable for transmitting movement of the take-off to the drive, and wherein in the decoupled state rotational movement of the take-off causes the coupling elements to move radially and orthogonally with regard to said rotational movement of the take-off, and (ii) wherein in the coupled state a moveable coupling locking element is located between the coupling elements so that the coupling elements can no longer move radially such that rotational movement of the take-off causes rotational movement of the coupling elements in a same direction together with the drive, further comprising an actuator for positioning the coupling locking element, wherein the actuator is bistable, wherein a mechanical potential formed by a storage device, has to be overcome for moving the coupling locking element from the decoupled state in a coupled state and/or from the coupled state in the decoupled state.

3. The device according to claim 1, wherein movement of the drive in the decoupled state cannot be transmitted to the take-off by the movement of the coupling elements because a resistance of the take-off cannot be overcome.

4. The device according to claim 1, wherein the coupling locking element causes a coupling as well as a decoupling of the drive and the take-off.

5. The device according to claim 4, wherein in the decoupled state the coupling locking element is not engaged with the coupling elements.

6. The device according to claim 1, wherein the actuator causes a displacement of the coupling locking element with a mechanical potential formed by a storage device, into a position suitable for coupling.

7. The device according to claim 1, wherein the actuator comprises an electromagnet arrangement having at least one yoke and a coil.

8. The device according to claim 1, wherein the device is manipulation resistant such that movement directions of the coupling elements are orthogonal with respect to attacks to be expected in a longitudinal direction of the device and/or counter-moments compensate for forces caused by an attack.

9. The device according to claim 1, wherein a mechanical potential formed by a storage device, has to be overcome for a relative movement between the drive and take-off, wherein said potential is lower than a mechanical potential of the take-off formed by the storage device.

10. The device according to claim 1, wherein the potential formed by the storage device, is such that when the force at a drive falls below a specific value, the coupling locking element can be brought into and/or out of a coupling position without the application of a force.

11. The device according to claim 1, wherein the drive and take-off are coupled by means of the coupling elements such that in the decoupled state movement of the take-off, with a stationary drive, causes a movement component of the coupling elements in an orthogonal direction thereto, and that movement of the take-off in the coupled state causes movement of the coupling elements in a same direction as take-off.

12. The device according to claim 1, wherein a movement of the coupling elements is orthogonal with respect to movement direction of the drive and does not cause movement of the take-off.

13. The device according to claim 1, wherein rotational movement of the coupling elements causes rotational movement of the take-off.

14. The device according to claim 1, wherein the coupling elements are pre-stressed with respect to the take-off and/or with respect to the drive.

15. The device according to claim 1, wherein a mechanical potential framed by a storage device, which has to be overcome for the movement of the take-off, acts on the coupling elements.

16. The device according to claim 1, wherein the coupling elements consists of at least one roller element or sliding element.

17. The device according to claim 16, wherein the roller elements or the sliding elements are guided in the drive such that the roller element or the sliding element moves in a radial direction with respect to said drive.

18. The device according to claim 16, wherein the roller elements or the sliding elements are pressed outwards by a spring element preferably consisting of a leg spring.

19. The device according to claim 16, wherein the take-off is configured such that the take-off comprises at least one projection at an inner side on which the roller elements or sliding elements move.

20. The device according to claim 16, wherein the roller elements or slide elements can give way in case of a relative movement between the drive and take-off when the drive and take-off are not coupled with each other.

21. The device according to claim 17, wherein the drive and the take-off are configured such that the roller elements or sliding elements can move inwards in case of rotation of the drive and overcome potential of the spring element wherein torque generated by said spring element is not sufficient to overcome a mechanical potential at the take-off, which is formed by a storage device.

22. The device according to claim 1, wherein the coupling locking element is supported such that a movement being necessary for engagement is perpendicular to an attack direction.

23. The device according to claim 1, wherein a mass center of the coupling locking element is selected such that, when the drive and take-off are not coupled with each other, the coupling locking element is supported in a rotational axis.

24. The device according to claim 1, wherein the coupling locking element is connected to a switch element by a coupling locking spring.

25. The device according to claim 24, wherein the switch element is operated by an actuator which comprises an electromagnet arrangement.

26. The device according to claim 24, wherein the coupling locking spring is arranged and configured such that when the switch element is operated by an electromagnet arrangement of the actuator, the coupling locking element can be moved into a position by the coupling locking spring in which the drive and take-off are coupled with each other.

27. The device according to claim 24, wherein the switch element and/or the coupling locking element comprises a switch element spring.

28. The device according to claim 27, wherein, for coupling, the switch element can be moved by an actuator such that the switch element spring is pre-stressed and that the coupling locking element connected to the switch element can be moved into a coupled position by spring forces.

29. The device according to claim 28, wherein the movement of the coupling locking element into a coupled position is limited by a stop so that the coupling locking spring can be pre-stressed.

30. The device according to claim 28, wherein the pre-stress of the switch element spring is suitable to move the coupling locking element into a decoupled position, when a magnetic force of an actuator is removed from the switch element for a short period of time.

31. The device according to claim 28, wherein the pre-stress of the coupling locking element and/or the switch element spring is suitable to release the switch element from an electromagnet arrangement of the actuator for decoupling, when a magnetic force of the actuator is removed from the switch element, and also when the coupling locking element is still clamped between the coupling elements due to an external torque acting on the drive.

32. The device according to claim 24, wherein the coupling locking element and the switch element are configured separately from each other and each comprises a spring element.

33. The device according to claim 32, wherein the switch element is operated by an actuator which comprises an electromagnet arrangement.

34. The device according to claim 32, wherein the spring elements are arranged such that the switch element holds the coupling locking element in a decoupled position and releases the coupling locking element when the coupling locking element is operated by the actuator, so that said coupling locking element can assume a coupled position.

35. The device according to claim 32, wherein the coupling locking element is connected to the coupling locking spring and the switch element is connected to the switch element spring.

36. The device according to claim 35, wherein the coupling locking element is held in a decoupled condition by the switch element by its switch element spring, wherein the switch element spring is pre-stressed.

37. The device according to claim 36, wherein the pre-stress of the switch element spring is suitable to release the switch element from an electromagnet arrangement of the actuator for decoupling, when a magnetic force of the actuator is removed from the switch element, also when the coupling locking element is still clamped between the coupling elements due to an external torque acting on the drive.

38. The device according to claim 35, wherein an actuator comprises an electromagnet consisting of at least one yoke and a coil, wherein an effective direction of the magnetic field between the switch element and the yoke is perpendicular with respect to an attack direction.

39. The device according to claim 38, wherein a current is provided through the coil for coupling the drive and the take-off, said current effecting a magnetic flux through the yoke and the coupling locking element and/or the switch element, which are at least partially magnetically permeable, wherein the coupling locking element is moved such that the roller element or sliding element can transmit a torque onto the take-off.

40. A lock device comprising a device according to claim 1.

41. The device according to claim 2, wherein the actuator causes a displacement of the coupling locking element with a mechanical potential formed by a storage device, into a position suitable for coupling.

42. The device according to claim 2, wherein the actuator comprises an electromagnet arrangement having at least one yoke and a coil.

* * * * *

UNITED STATES PATENT AND TRADEMARK OFFICE

CERTIFICATE OF CORRECTION

PATENT NO. : 8,539,802 B2
APPLICATION NO. : 10/556012
DATED : September 24, 2013
INVENTOR(S) : Herbert Meyerle It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1195 days.

Signed and Sealed this
Fifteenth Day of September, 2015

Michelle K. Lee

Michelle K. Lee
*Director of the United States Patent and Trademark Office*